United States Patent [19]
Liebing

[11] 4,270,048
[45] May 26, 1981

[54] APPARATUS FOR DETERMINING THE ANGLE OF INCIDENT ELECTROMAGNETIC RADIATION

[75] Inventor: Lotar Liebing, Neuhausen, Fed. Rep. of Germany

[73] Assignee: Deutsche Forschungs-und-Versuchsanstalt für Luft-und Raumfahrt e.V., Bonn, Fed. Rep. of Germany

[21] Appl. No.: 81,440

[22] Filed: Oct. 3, 1979

[30] Foreign Application Priority Data

Mar. 17, 1979 [DE] Fed. Rep. of Germany ....... 2910588

[51] Int. Cl.³ .............................................. H01J 3/14
[52] U.S. Cl. ..................................... 250/216; 350/6.6
[58] Field of Search ............... 250/216, 234, 235, 236; 350/6.6; 356/141, 152

[56] References Cited
U.S. PATENT DOCUMENTS 4,039,246  8/1977  Voigt ................................ 250/236
4,161,652  7/1979  Moreau et al. ..................... 356/152
4,175,832  11/1979 Umeki et al. ........................ 350/6.6

Primary Examiner—David C. Nelms
Attorney, Agent, or Firm—Laubscher & Laubscher

[57] ABSTRACT

Apparatus for receiving electromagnetic radient energy is disclosed, including a radiation detection element, a movable optical element for directing the radiation toward the detection element, and a drive system for automatically adjusting the position of the optical element to cause the radiation to always be directed toward the detection element. The drive system includes a pivotally mounted permanent magnet connected with the optical element, a plurality of coils arranged circumferentially about the magnet, and radiation-responsive control circuit for selectively energizing the coils to produce a magnetic field that displaces the magnet and the optical element to maintain direction of the radiation upon the radiation detection element.

15 Claims, 5 Drawing Figures

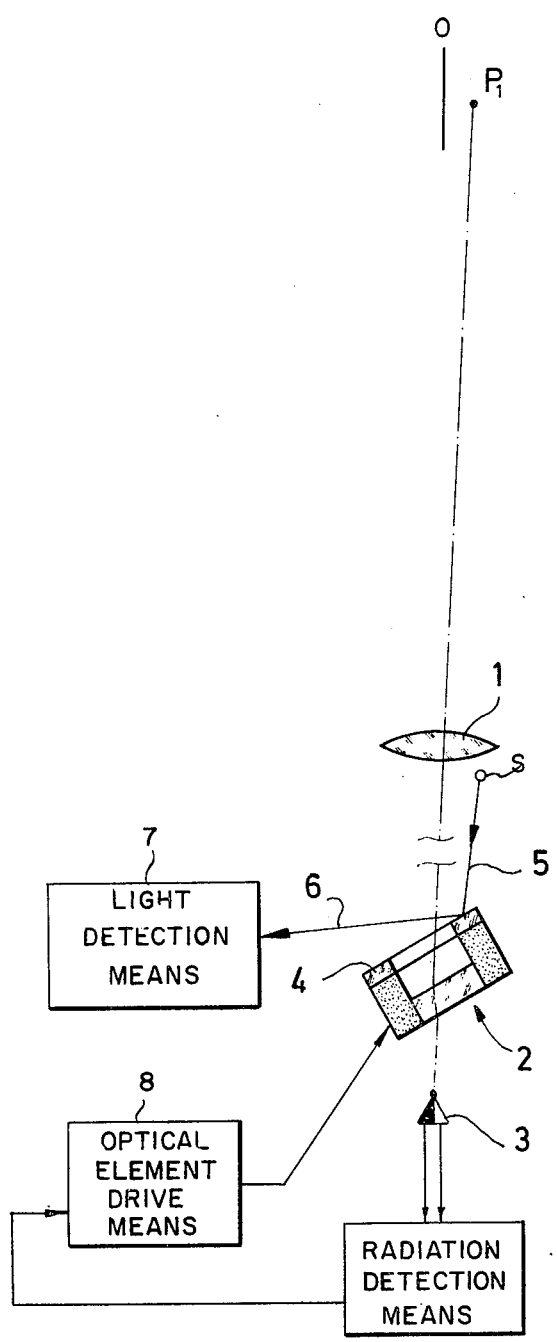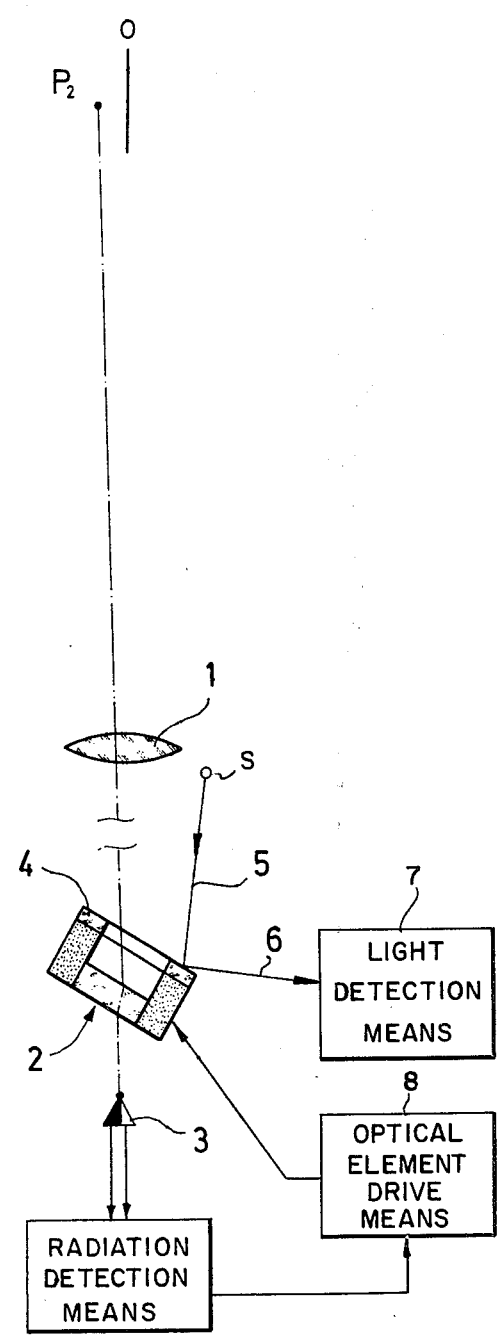

APPARATUS FOR DETERMINING THE ANGLE OF INCIDENT ELECTROMAGNETIC RADIATION

BRIEF DESCRIPTION OF THE PRIOR ART

This invention relates to an apparatus for receiving electromagnetic radiation having various angles of incidence, including a radiation detection element, a movable optical element for directing the radiation to the detection element, and drive means for adjusting the position of the optical element, including a magnet firmly connected with the optical element, and means for producing a magnetic field which is so adjustable that the radiation is always guided to the detection element independently of the angle of incidence of the radiation.

Devices of this kind are used in order to take bearings on remote objects, for example, satellites, and to direct a receiving or transmitting antenna permanently upon these remote objects. This is especially important when signals are to be exchanged between the remote object and the device, especially when a laser beam is used which represents a very sharply limited light beam.

In known devices of this kind, radiation energy, emitted by an object toward which it is desired to establish a bearing, is directed by means of a pivotable reflector toward a fixed detector and, in the process, the position of the reflector is so moved in following up the beam that the incident radiation will strike the fixed detector no matter what the position might be of the observed object. To attain this, the detector and the reflector drive means (for example, a servomotor) are connected with each other by means of a control circuit. Minor deviations in the absorbed radiation lead to intensity changes in the detector and those changes are balanced out by having the reflector follow this movement.

Devices of this kind can be used to sight remote objects with great accuracy.

It is also known that the particular position of the movable reflector can be used to determine the angle at which the radiation will strike the device. But since the known device is used primarily for optimum tracking, the angle measurement was merely a byproduct, i.e., the optimization of the angle measurement method was not in any way taken into consideration in the known device.

In using a thermal motor for the movable reflector element, it was already known that one can firmly connect a magnet with the reflector and that one can arrange the magnet in an external magnetic field in such a manner that the control circuit, connected with the detector, will vary the position of the reflector owing to a change in the magnetic field. Such a device likewise however was primarily intended for tracking an object, not for angle measurement.

In many areas of application, for example, in surveying bridge piers which bend because of solar radiation, in determining the resonances of buildings and towers which are excited by the effects of the wind, or in the registration of the earth in earthquake regions, it is extremely important to determine with great accuracy the angle at which radiation energy from such an object arrives at the reference point (i.e., to measure the angle of incidence of the radiation emitted by the object).

Apart from the fact that the above-described devices are used primarily for tracking of very remote objects, such as satellites, and apart from the fact that no special attention was paid here to angle measurement, for the determination of angular shifts in the fields of application described herein, the devices are primarily of the type in which the subject is sighted by eye with a telescope. In these devices, there is no automatic alignment with the object to be surveyed, and in practice, therefore, they are even less suited for the determination of small and very small angular changes than the object tracking mechanisms which are used basically used for a different purpose.

SUMMARY OF THE INVENTION

The primary object of the present invention is to provide an improved apparatus of the object tracking type in which angle measurements of utmost accuracy can be automatically performed.

In a device of the kind described initially, this problem is solved according to the invention in that the magnet is positioned in a cage so that it can be pivoted around a first pivot axis, which cage, in turn, can be pivoted about a second pivot axis extending perpendicular thereto, the magnet being permanently magnetized in a radial direction parallel to a plane containing the first pivot axis, there being circumferentially arranged about the magnet a plurality of coils contained in a second plane which also contains the second pivot axis, the axes of the coils extending normal to said second plane, whereby upon selective excitation of the coils, the magnet can, as desired, be pivoted about one or both of the pivot axes.

By the use of a device of this kind, it becomes possible to pivot the optical element around two axes which are perpendicular to each other in order also to measure angular changes which do not take place in a given plane.

Preferably, the magnet is of annular configuration. In one preferred version of the invention, four magnetic coils are arranged at the corners of a square which is rotated by 45° with respect to the second rotation axis. To move the device, the coils which are arranged at diagonally opposite corners of the square are simultaneously energized.

While on the one hand, the optical element, which is connected with the magnet, can be a reflector, it is particularly advantageous to use as the optical element a plate having parallel opposite faces, which plate is transparent to the radiation. By using such a plate, the sensitivity of this arrangement is greatly increased because, to balance out minor angular changes in the incidence radiation, considerable swing angles are required for the parallel-faced transparent plate.

To determine the position of the magnet and the optical element, a reflector may be attached to the magnet adjacent the optical element, whereby radiation can then be reflected against that reflector. It is advantageous to make sure that this reflector, used in location determination, will be an annular reflector.

Means are also provided for the excitation of the coils in such a manner that a force will act upon the magnet which tends to pivot the magnet essentially normal to its magnetization plane. This is particularly advantageous when the magnet is positioned in a bearing that is open on one side and when it can be pressed, by the magnet coils, out of the bearing against a fixed calibration stop. It is then possible, by means of a corresponding excitation of the magnetic coil, to press the magnet against the calibration stop so that it will assume one defined starting position. The magnet can then, in the course of operation, be loaded by means of the magnetic coils by a force which presses the magnet into the bearing so that, even if a bearing is provided which is open on one side, a well-defined guidance of the magnet in the bearing can be guaranteed.

A particularly great increase in the angular change detection sensitivity is achieved when the interval between an initial receiving optical system and the optical element connected with the magnet is considerably greater than the interval between the optical element and the detection element.

BRIEF DESCRIPTION OF THE DRAWING

Other objects and advantages of the invention will become apparent from the study of the accompanying drawing, in which:

FIGS. 1 and 2 are diagrammatic illustrations of the radiation receiving apparatus of the present invention for receiving incident radiation from first and second measurement points P1 and P2, respectively;

DETAILED DESCRIPTION

Figure 3:
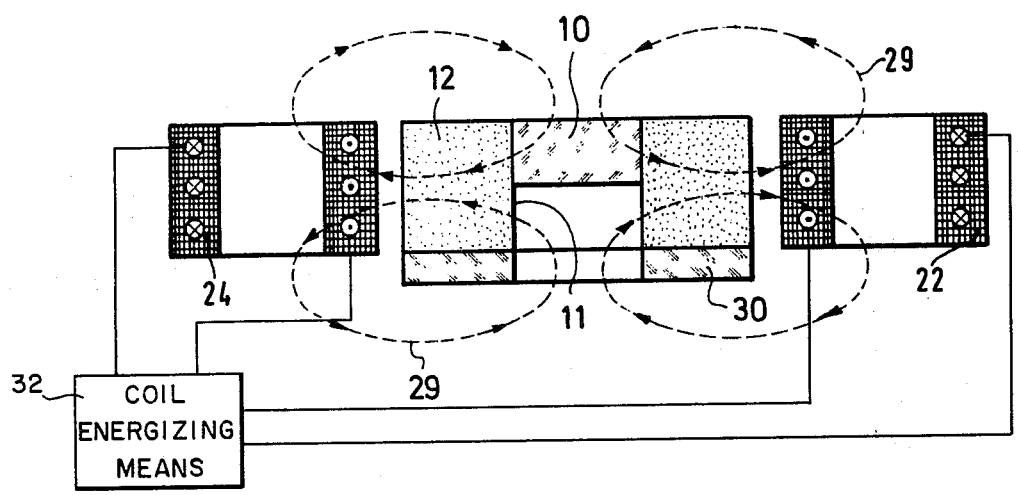
FIGS. 3 and 4 are, respectively, a cross-sectional view taken along line 3—3 of FIG. 4, and a top plan view of the optical element and its drive means.

Referring first more particularly to FIGS. 1 and 2, the radiation emitted from an object P1 or P2 is received via an initial receiving optical system 1 which in the illustration of FIGS. 1 and 2 is shown schematically as a focusing lens. It should be mentioned, however, that optical systems of other known design could be used for this purpose as well.

From the initial receiving optical system 1, the radiation is directed upon a pivotally mounted optical element 2. Optical element 2 directs the incident radiation toward a radiation detection element 3 that is connected, in turn, with a drive circuit 8 which—as a function of the radiation incidence upon the detector—so activates drive elements for the optical element 2 (which are not completely illustrated in FIGS. 1 and 2) that the radiation always strikes the radiation detection element 3 in the same manner. The detection element 3, the subsequently connected drive circuit 8, and the optical element 2 with the drive means thus constitute a control circuit. The position of the optical element thus depends on the angle of incidence of the radiation (i.e., the position of the optical element is a measure of the angle of incidence). This can be clearly recognized in FIGS. 1 and 2. While object P1 is arranged to the right of an imaginary zero point, object P2 is located to the left of that imaginary zero point. In other words, the angle of incidence varies. In order to guide the radiation to the fixed detection element 3 in the same manner in spite of this, the optical element 2 must assume a differing position.

To be able to determine that position, the optical element 2 is rigidly connected with a reflector or mirror 4 from which a light ray 5 from a fixed light source S is reflected. Depending upon the position of optical element 2 and thus of reflector 4, the reflected light ray 6 is reflected in various directions so that the reflection direction can be used by the light detection means 7 for the indication of the position of optical element 2.

Figure 4:
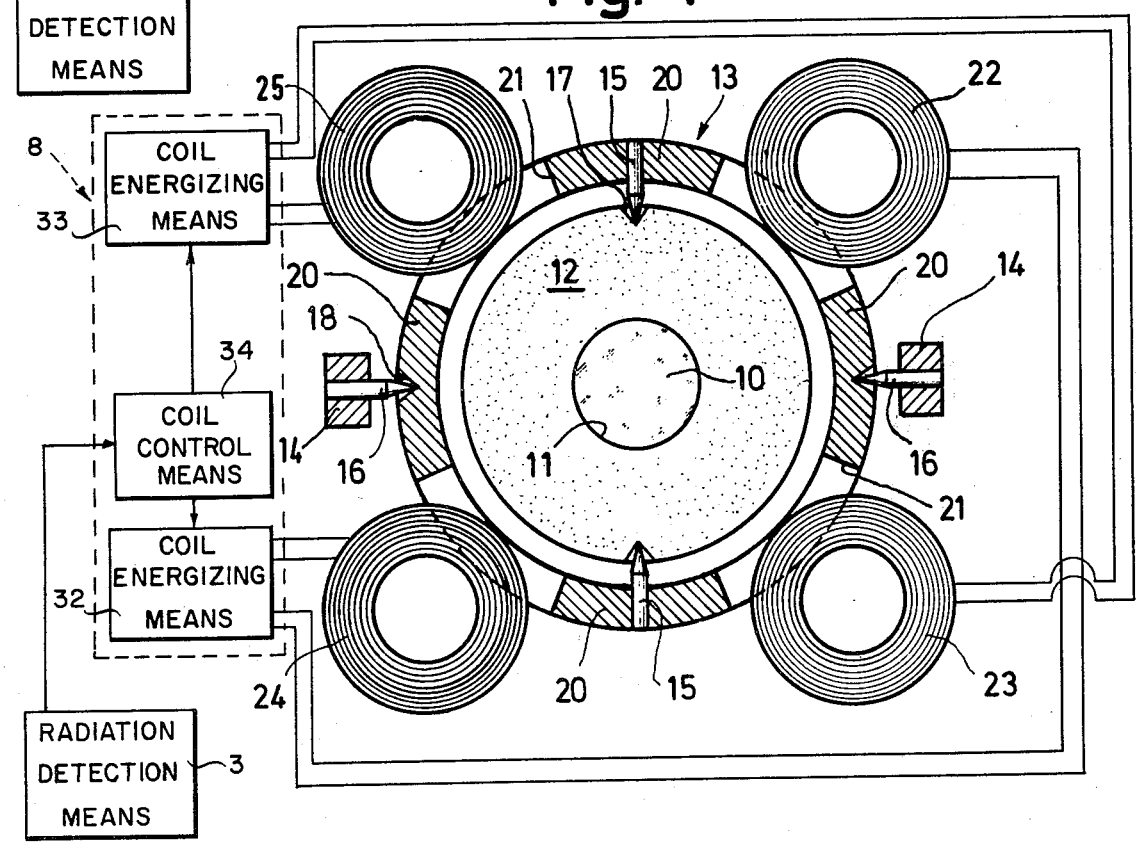

Referring now to FIGS. 3 and 4, a preferred embodiment of an optical element with associated drive means will be described. Optical element 2 comprises a plate 10 having parallel opposite faces, which plate is formed of a material (such as glass) that is transparent relative to the incident radiation. The plate 10 is mounted in the central opening 11 of an annular permanent magnet 12 that is magnetized in the radial direction. The rigid unit, consisting of magnet 12 and plate 10, is positioned in a cage 13 (FIG. 4) for movement about a first pivot axis defined by a pair of diametrically arranged pins 15. Cage 13 in turn is positioned in a fixed bearing block 14 for pivotable movement about an orthogonally arranged second pivot axis defined by a second pair of diametrically arranged pins 16, whereby, on the whole a cardan suspension for the magnet-plate unit is provided.

In the example of FIG. 4, magnet 12 and cage 13 are supported by means of bearing pins 15 and 16 which engage corresponding recesses 17 and 18, respectively.

Figure 5:
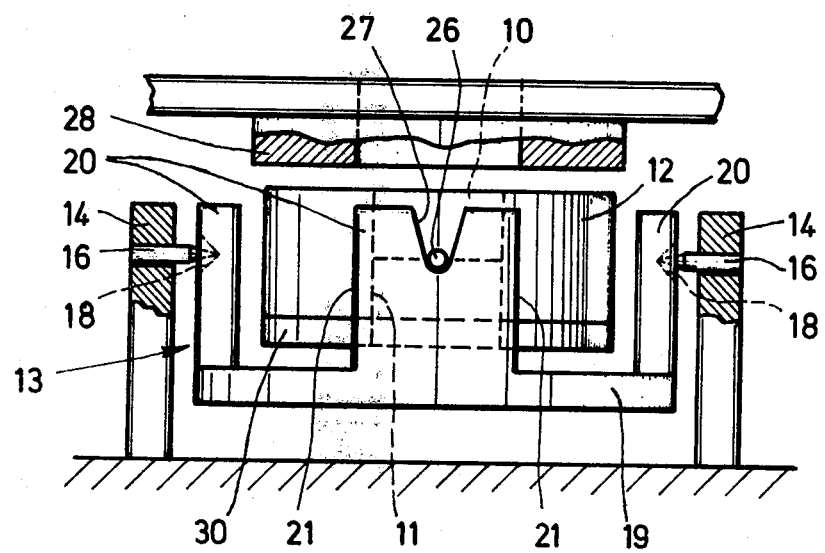
FIG. 5 is a partly broken away side elevational view of a modification of the apparatus of FIG. 4.

As seen from the example of FIG. 5, which is somewhat modified in other respects, cage 13 includes a base plate 19 and four axially-extending bearing bars 20 which are in each case circumferentially spaced at 90° increments to define therebetween the four gaps 21.

As seen from the illustration of FIG. 4, the annular magnet 12 is surrounded by four circumferentially spaced magnet coils 22, 23, 24, and 25 which are so arranged at the corners of a square that the coils extend partly in the gaps 21 of cage 13. The four coils are located in a plane which runs parallel to the second pivot axis defined by bearing pins 16, the coil axes being perpendicular to this plane. The diagonals of the square, which connect coils 22 and 24, the coils 23 and 25, respectively, are shifted by 45° with respect to the rotation axis defined by bearing pins 16 so that, on the whole, a symmetrical arrangement is provided where bearing points and magnetic coils alternate with each other along the circumference of the unit.

In the modification of FIG. 5, which is constructed in a manner similar to FIG. 4 and where corresponding parts had been given the same reference numbers, the structure is modified inasmuch as the annular magnet 12 is not positioned via bearing pins extending into a recess in the ring-shaped magnet, but rather by bearing pegs 26 which are mounted in open-ended bearing recesses 27 contained in a pair of diametrically opposed bearing bars 20. Adjacent the open side of the bearing recesses 27 there is mounted a fixed stop or lug 28 opposite the annular magnet 12, which lug may be, for example, a ring rigidly connected with frame 31.

During the operation of the device according to the invention, diagonally opposite coils are normally excited in pairs, specifically in the manner illustrated in FIG. 3, wherein the developed magnetic field lines 29 are illustrated diagrammatically. In this circuit, there is generated, in the area of the annular magnet, a magnetic field which leads to a deflection of the magnet. Due to the excitation of both coil pairs 22-24 and 23-25 by coil energizing means 32 and 33, respectively, the annular magnet 12 is pivoted about a desired pivot axis by a desired amount. The control of the coils is accomplished by coil control means 34 which is so controlled by the detection element that the incident radiation, deflected by optical element 2, will always strike the detection element 3 in the same fashion.

In order to be able to determine the particular position of the annular magnet and thus of the optical element, the annular magnet carries an annular mirror 30 (FIGS. 3 and 5) which is hit by a light ray of constant direction of incidence (in a manner explained with regard to FIGS. 1 and 2) and which is reflected at various angles, depending upon the position of the optical element.

With the optical element drive means of the present invention, it is possible to determine with maximum accuracy the angular changes of the incident ray in two mutually perpendicular planes. Because of the magnetic, contactless drive of the optical element 2, only extremely minor friction forces are produced, whereby a very fine deflection of the optical element may be produced with great precision.

As described above, the diagonally opposite coils are excited in pairs to pivot the annular magnet 12. It is, moreover, also possible to excite all of the coils together in such a manner that a force, directed parallel to the coil axis, will act upon the annular magnet. In the example illustrated in FIG. 5, this possibility is used for the adjustment of the optical element. In this embodiment, the coils are connected in such a manner that the annular magnet will be lifted out of bearing recess 27 and will be pressed against the stop or lug 28 which is fixed upon the frame so that it will assume a well-defined initial position which can be used for the calibration of the device. Conversely, the coils can, in the course of operation, be so connected that the annular magnet is pressed against the closed end of bearing recesses 27 and will thus be kept in a well-defined position. Of course, it is possible to superpose the excitation of the coils for the purpose of pivoting the annular magnet and for the purpose of proper bearing guidance in such a manner that a well-defined bearing position will be given also in the course of operations when we have bearing recesses that are open on one side.

While the optical element 2, which is connected with the annular magnet 12, can basically also be a reflector or mirror, it is advantageous here to use a parallel-faced plate formed of a material (such as glass) that is transparent relative to the radiation. While a mirror changes the direction of the incident radiation through deflection, the incident ray in the case of a parallel-faced plate 10 is emitted in the same direction, although shifted in a parallel manner, due to refraction along the boundary surfaces. When parallel-faced plates are used, larger swing angles for the optical element are required in order to guide the incident ray, in case of a given angular change, toward the detector (in other words, a swing angle greater than in the case of reflecting optical elements). Thus, the device becomes more sensitive when parallel-faced plates are used. The sensitivity moreover can be influenced by the choice of plate thickness.

A further increase in sensitivity can be achieved when the interval between the receiving optical system 1 and the optical element 2 is considerably greater than the interval between optical 2 and detection element 3.

A suitable detection element 3 for controlling the described magnetic drive means could be, for example, of the so-called quadrant sensor type—i.e., a detection element whose surface is subdivided into four separate quadrants. The coil control means 34 includes a comparison circuit connected with this sensor for comparing the radiation hitting each quadrant with the radiation of the other quadrants, whereby the coils may be energized in such a manner that the intensity on all four quadrants will always be the same.

Using a device of the kind described, angular changes on the order of magnitudes of several microrad may be determined. In other words, an extraordinarily accurate angle measurement device is provided which can be used in the manner described initially for surveys and similar purposes. For this purpose, for example, there can be attached to a part to be surveyed an active light source or a retro-reflector which will reflect the radiation from a fixed light source S toward the angle measurement device.

In a simplified version of the invention, magnet 12 and the optical element 2 or 10, connected with it, without cage 13, need be pivotable only around a single axis (for example, the axis 15). In this case, only angles located in a certain plane are measured. In this case, we need only two magnetic coils (for example, coils 22, 24) for the purpose of moving magnet 12, but those coils are then arranged on a straight line which is perpendicular to the pivot axis 15 or 16 and which extends adjacent the magnet 12.

While the preferred forms and embodiments have been illustrated and described, it will be apparent to those skilled in the art that changes and modifications may be made without deviating from the inventive concepts set forth above.

What is claimed is:

1. In an apparatus for receiving electromagnetic radiation energy at various angles of incidence and for directing the radiation energy upon a stationary radiation detection device (3), including a movable optical element (2) for directing the radiation upon the detection element, a magnet (12) rigidly connected with the optical element, and means (22–25) for producing an adjustable external magnetic field for reacting with the field of the magnet to displace the optical element to cause the radiation to be always directed, independently of the angle of incidence of the radiation, upon the detection element:

the improvement which comprises
(a) a cage (13);
(b) first pivot means (15) connecting said magnet with said cage for pivotal movement about a first pivot axis;
(c) second pivot means (16) connecting said cage for pivotal movement about a second pivot axis;
(d) said magnet being permanently magnetized in a radial direction parallel to a first plane containing said first pivot axis; and
(e) coil means (22, 24; 23, 25) for generating an electromagnetic field for reaction with the field of the permanent magnet to pivot said magnet about at least one of said first and second pivot axes, said coil means including a plurality of coils arranged in a second plane containing said second pivot axis, the axes of said coils being normal to said second plane, whereby upon selective energization of the coils, the magnet can be pivoted about a desired pivot axis.

2. Apparatus as defined in claim 1, wherein said magnet is annular.

3. Apparatus as defined in claim 2, wherein four of said coils are arranged in circumferentially spaced relation about said magnet, the centers of said coils being arranged at the corners of a square that is contained within said second plane and is rotationally displaced from said second pivot axis by an angle of 45°.

4. Apparatus as defined in claim 3, and further including means (32, 33) for simultaneously energizing pairs of coils arranged at diagonally opposite corners of the square, respectively.

5. Apparatus as defined in claim 2, wherein said optical element comprises reflector means (4; 30).

6. Apparatus as defined in claim 2, wherein said optical element comprises a plate (10) having parallel opposite faces, said plate being transparent relative to the incident radiation energy.

7. Apparatus as defined in claim 6, wherein said plate is mounted in the central opening (11) of said annular magnet.

8. Apparatus as defined in claim 6, and further including reflector means (4; 30) connected with said optical element for reflecting incident radiation energy, and means (7) responsive to the reflected energy for selectively energizing said coil means to direct at least a portion of the incident radiation energy onto said radiation detection means.

9. Apparatus as defined in claim 8, wherein said reflector means is annular and coaxially arranged relative to said magnet.

10. Apparatus as defined in claim 8, wherein said coil means are so energized as to produce a force acting on said magnet in a direction causing said magnet to pivot generally normal to its plane of magnetization.

11. Apparatus as defined in claim 10, wherein at least one of said first and second pivot means comprises open-ended bearing means (27), said coil means being operable to pivot said magnet in a direction out of said open-ended bearing means; and further including fixed stop means (28) for limiting the extent to which said magnet may be pivoted out of said open-ended bearing means.

12. Apparatus as defined in claim 11, wherein said coil means is operable to apply to said magnet a magnetic force biasing said magnet into said open-ended bearing means.

13. Apparatus as defined in claim 1, and further including an initial receiving optical system (1) for directing the incident radient energy upon said movable optical element, the distance between said initial receiving optical system and said movable optical element being greater than the distance between said movable optical element and said detection element.

14. In an apparatus for receiving electromagnetic radiation energy at various angles of incidence and for directing the radiation energy upon a stationary radiation detection device (3), including a movable optical element (2) for directing the radiation upon the detection element, a magnet (12) rigidly connected with the optical element and means for producing an adjustable external magnetic field for reacting with the field of the magnet to displace the optical element to cause the radiation to be always directed, independently of the angle of incidence of the radiation, upon the detection element;

the improvement which comprises
(a) pivot means supporting said magnet for movement about at least one pivot axis, said magnet being permanently magnetized in a radial direction parallel to a first plane containing said one pivot axis; and
(b) coil means for generating an electromagnetic field for reaction with the field of the permanent magnet to pivot said magnet about said pivot axis, said coil means including a plurality of coils arranged in a second plane, the axes of said coils being normal to said second plane, whereby upon energization of the coils, the magnet is pivoted about said pivot axis.

15. Apparatus as defined in claim 14, wherein said coil means consists of a pair of coils arranged adjacent, and on diametrically opposite sides of, said magnet along a line normal to said pivot axis.

* * * * *